(12) United States Patent
Staten et al.

(10) Patent No.: US 8,290,754 B1
(45) Date of Patent: Oct. 16, 2012

(54) QUADRILATERAL/HEXAHEDRAL FINITE ELEMENT MESH COARSENING

(75) Inventors: Matthew L. Staten, Pittsburgh, PA (US); Mark W. Dewey, Provo, UT (US); Michael A. Scott, Pflugerville, TX (US); Steven E. Benzley, Provo, UT (US)

(73) Assignee: Sandin Corporation, Albuquerque, NM (US)

( * ) Notice: Subject to any disclaimer, the term of this patent is extended or adjusted under 35 U.S.C. 154(b) by 1158 days.

(21) Appl. No.: 11/873,864

(22) Filed: Oct. 17, 2007

Related U.S. Application Data

(60) Provisional application No. 60/852,544, filed on Oct. 18, 2006.

(51) Int. Cl.
G06F 7/60 (2006.01)
G06F 17/10 (2006.01)
(52) U.S. Cl. ............................................. 703/2; 703/1
(58) Field of Classification Search ................... 703/2, 1
See application file for complete search history.

(56) References Cited

U.S. PATENT DOCUMENTS

| 7,098,912 B1 | 8/2006 | Borden et al. |
| 7,181,377 B1 | 2/2007 | Borden et al. |
| 7,219,039 B1 | 5/2007 | Shepherd et al. |

OTHER PUBLICATIONS

Li et al. "3D anisotropic mesh adaptation by mesh modification" Elsevier 2004.*

Plaza A, Carey GF. (1996) About local refinement of tetrahedral grids based on bisection. *Proc. 5th Int. Meshing Roundtable*, Sandia National Laboratories, Pittsburgh, PA, 123-136.
Plaza A, Rivara MC. (2003) Mesh refinement based on the 8-tetrahedra longest-edge partition. *Proc. 12th Int. Meshing Roundtable*, Sandia National Laboratories, Santa Fe, NM, 67-78.
De Cougny HL, Shephard MS. (1999) Parallel refinement and coarsening of tetrahedral meshes. *Int. J. Witmer. Meth. Eng.*, 46(7):1101-1125.
Bey J. (1995) Tetrahedral grid refinement. *Computing*, 55(4): 355-378.
Grosso R, Lurig C, Ertl T. (1997) The multilevel finite element method for adaptive mesh optimization and visualization of volume data. *IEEE Visualization*, 387-394.
Molino N, Bridson R, Teran J, Fedkiw R. (2003) A crystalline, red green strategy for meshing highly deformable objects with tetrahedra. *Proc. 12th Int. Meshing Roundtable*, Sandia National Laboratories, Santa Fe, NM, 103-114.
Tchon K, Hirsch C, Schneiders R. (1997) Octree based hexahedral mesh generation for viscous flow simulations. *13th AIAA Computational Fluid Dynamics Conference*, AIAA-971980.
Staten M. (1996) Selective refinement of two and three-dimensional finite element meshes. M.S. Thesis, Brigham Young University, Provo, Utah.
Staten M. (1997) Local refinement of three-dimensional finite element meshes. *Eng. Comput.*, 13: 165-174.

(Continued)

*Primary Examiner* — Saif Alhija
(74) *Attorney, Agent, or Firm* — Cory G. Claassen

(57) ABSTRACT

A technique for coarsening a finite element mesh ("FEM") is described. This technique includes identifying a coarsening region within the FEM to be coarsened. Perimeter chords running along perimeter boundaries of the coarsening region are identified. The perimeter chords are redirected to create an adaptive chord separating the coarsening region from a remainder of the FEM. The adaptive chord runs through mesh elements residing along the perimeter boundaries of the coarsening region. The adaptive chord is then extracted to coarsen the FEM.

24 Claims, 15 Drawing Sheets

OTHER PUBLICATIONS

Marechal L. (2001) A new approach to octree-based hexahedral meshing. *Proc. 10th Int Meshing Roundtable*, Sandia National Laboratories, Newport Beach, CA, 209-221.

Zhang Y, Bajaj C. (2004) Adaptive and quality quadrilateral/hexahedral meshing from volumetric data. *Proc. 13th Int. Meshing Roundtable*, Sandia National Laboratories, Williamsburg, VA, 365-376.

Schneiders R. (2000) Octree-based hexahedral mesh generation. *Int. J. Comma. Geom. Ap.*, 10(4): 383-398.

Kwak DY, Im YT. (2002) Remeshing for metal forming simulations—Part II: Three-dimensional hexahedral mesh generation. *Int. J. Meth. Eng.*, 53(11): 2501-2528.

Li H, Cheng G. (2000) New method for graded mesh generation of all hexahedral finite elements. *Comput. Struct.*, 76(6): 729-740.

Tchon K, Dompierre J, Camarero R. (2002) Conformal Refinement of all-quadrilateral and all-hexahedral meshes according to an anisotropic metric. *Proc. 11th Int. Meshing Roundtable*, Sandia National Laboratories, Ithaca, NY, 231-242.

Tchon K, Dompierre J, Camarero R. (2004) Automated refinement of conformal quadrilateral and hexahedral meshes. *Int. J. Numer. Meth. Eng.*, 59(12):1539-1562.

Borden M, Benzley S, Shepherd J. (2002) Hexahedral Sheet Extraction. *Proc. 11th Int. Meshing Roundtable*, Sandia National Laboratories, Ithaca, NY, 147-152.

Kallinderis Y, Kavouklis C. (2005) A dynamic adaptation scheme for general 3-D hybrid meshes. *Comput. Method Appl. M.*, 194:5019-5050.

Benzley S, Harris N, Scott M, Borden M, Owen S. (2005) Conformal Refinement and Coarsening of Unstructured Hexahedral Meshes. *J. of Comp. Information Sci. in Eng.*, 5(4): 330-337.

Tautges T, Blacker T, Mitchell S. (1996) The whisker weaving algorithm: A connectivity-based method for all-hexahedral finite element meshes. *Int. J. Numer. Meth. Eng.*, 39(19): 3327-3349.

Melander D, Tautges T, Benzley S. (1997) Generation of multi-million element meshes for solid model-based geometries: the dicer algorithm. ASME—*Trends in Unstructured Mesh Generation*, 220: 131-135.

Staten M, Canann S. (1997) Post refinement element shape improvement for quadrilateral meshes. ASME—*Trends in Unstructured Mesh Generation*, 220: 9-16.

Murdoch P, Benzley S, Blacker T, Mitchell S. (1997) The spatial twist continuum: A connectivity based method for representing all-hexahedral finite element meshes. *Finite Elem. Anal. Des.*, 28(2):137-149.

Blacker T., The Cooper Tool. (1996) *Proc. 5th Meshing Roundtable*, Sandia National Laboratories, Pittsburgh, PA, 13-29.

Staten M., Cannan S., Owen S. (199S) BMSweep: Locating interior nodes during sweeping. *Proc. 7th Int. Meshing Roundtable*, Dearborn, MI, 7-18.

Staten M., Benzley S., Scott M. (Jul. 16-22, 2006) Conformal Quadrilateral/ Hexahedral Mesh Coarsening. PowerPoint Presentation, WCCM VII, Los Angeles, California.

\* cited by examiner

TETRAHEDRAL        HEXAHEDRAL        WEDGE        PYRAMID

TRIANGULAR        QUADRILATERAL

QUADRILATERAL MESH ELEMENT

QUADRILATERAL CHORD SHADED GRAY

MESH

MESH DUAL

CHORD EXTRACTION FROM QUADRILATERAL MESH

CHORD DICING IN A QUADRILATERAL MESH

ELEMENT COLLAPSE

ELEMENT OPEN

HEXAHEDRAL MESH    HEXAHEDRAL COLUMN    HEXAHEDRAL COLUMN

HEXAHEDRAL MESH    SHEET    SHEET

QUADRILATERAL/HEXAHEDRAL FINITE ELEMENT MESH COARSENING

CROSS REFERENCE TO RELATED APPLICATION

This application claims the benefit of U.S. Provisional Application No. 60/852,544, filed on Oct. 18, 2006, the contents of which are incorporated herein by reference.

This application discloses subject matter that is related to subject matter disclosed in co-pending U.S. Ser. No. 11/874,008 entitled "QUADRILATERAL FINITE ELEMENT MESH COARSENING", and U.S. Ser. No. 11/874,064 entitled "HEXAHEDRAL FINITE ELEMENT MESH COARSENING USING PILLOWING TECHNIQUE", both filed concurrently herewith.

STATEMENT REGARDING FEDERALLY SPONSORED RESEARCH

This invention was made with Government support under Contract No. DE-AC04-94AL85000 between Sandia Corporation and the U.S. Department of Energy. The U.S. Government has certain rights in this invention.

TECHNICAL FIELD

This disclosure relates generally to finite element analysis and continuum mechanics, and in particular but not exclusively, relates to mesh coarsening of finite element meshes.

BACKGROUND INFORMATION

Finite element analysis (FEA) is the process of creating a finite element mesh ("FEM"), which represents a physical domain upon which some physical phenomenon is to be analyzed. These domains can be broken up into either two dimensional ("2D") or three dimensional ("3D") domains. 3D domains represent the full-3D dimensions of an actual 3D domain. 3D domains are most often modeled with either tetrahedral or hexahedral elements. Less often, 3D domains are modeled with pyramid or wedge elements. FIG. 1 illustrates these four basic element types.

2D domains represent a physical phenomenon which is geometrically located in some kind of surface (either planar or non-planar), such as surface wave front propagation in liquids, or a thin sheet metal object such as the hood of a car. In addition, 2D domains are used to represent a simplification of a 3D domain, such as a cross-section of a 3D domain. 2D domains are most often modeled with either quadrilateral or triangular elements. FIG. 2 illustrates these 2D element types.

FEMs are typically composed of a single element type. For example, a hexahedral mesh is composed of only hexahedral elements. A "hybrid" mesh is a mesh composed of more than a single element type. For most FEA solvers, a non-hybrid mesh is preferred. Many FEA solvers do not support hybrid meshes.

During the process of FEA, it may become necessary to modify the density of mesh elements in a local region of a mesh in order to better adapt the mesh to the physics being modeled in the analysis. Refinement is the process of adding elements to the mesh. Coarsening is the process of removing elements from the mesh. There are many types of refinement and coarsening. However, for many applications, the most applicable types of refinement and coarsening are those that (1) are conformal, (2) are localized, (3) maintain the original mesh element type (i.e. non-hybrid), and (4) are independent of prior refinements.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 5 illustrates a quadrilateral chord, in accordance with an embodiment of the invention.

DETAILED DESCRIPTION

Embodiments of a technique for mesh coarsening of finite element meshes ("FEMs") are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

DEFINITIONS

Throughout this specification, several terms of art are used. These terms are to take on their ordinary meaning in the art from which they come, unless specifically defined herein or the context of their use would clearly suggest otherwise.

Quadrilateral Mesh: A quadrilateral mesh is a two-dimensional ("2D") finite element mesh ("FEM") formed of a plurality of quadrilateral elements linked together on a planar or non-planar surface.

Hexahedral Mesh: A hexahedral mesh is a three-dimensional ("3D") FEM formed of a plurality of hexahedron elements linked together.

Mesh Coarsening: Mesh coarsening is the act of reducing the number of mesh elements in a FEM.

Mesh Refinement: Mesh refinement is the action of increasing the number of mesh elements in a FEM.

Figure 1:
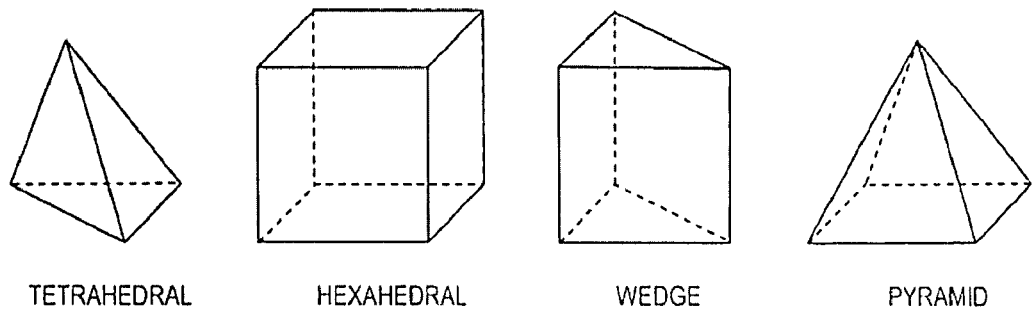
FIG. 1 (prior art) illustrates some of the basic mesh elements of three-dimensional finite element meshes ("FEMs").
Figure 2:
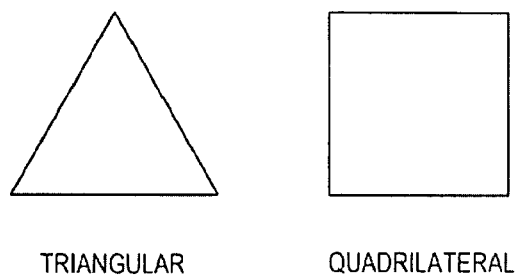
FIG. 2 (prior art) illustrates some of the basic mesh elements of two-dimensional FEMs.
Figure 3:
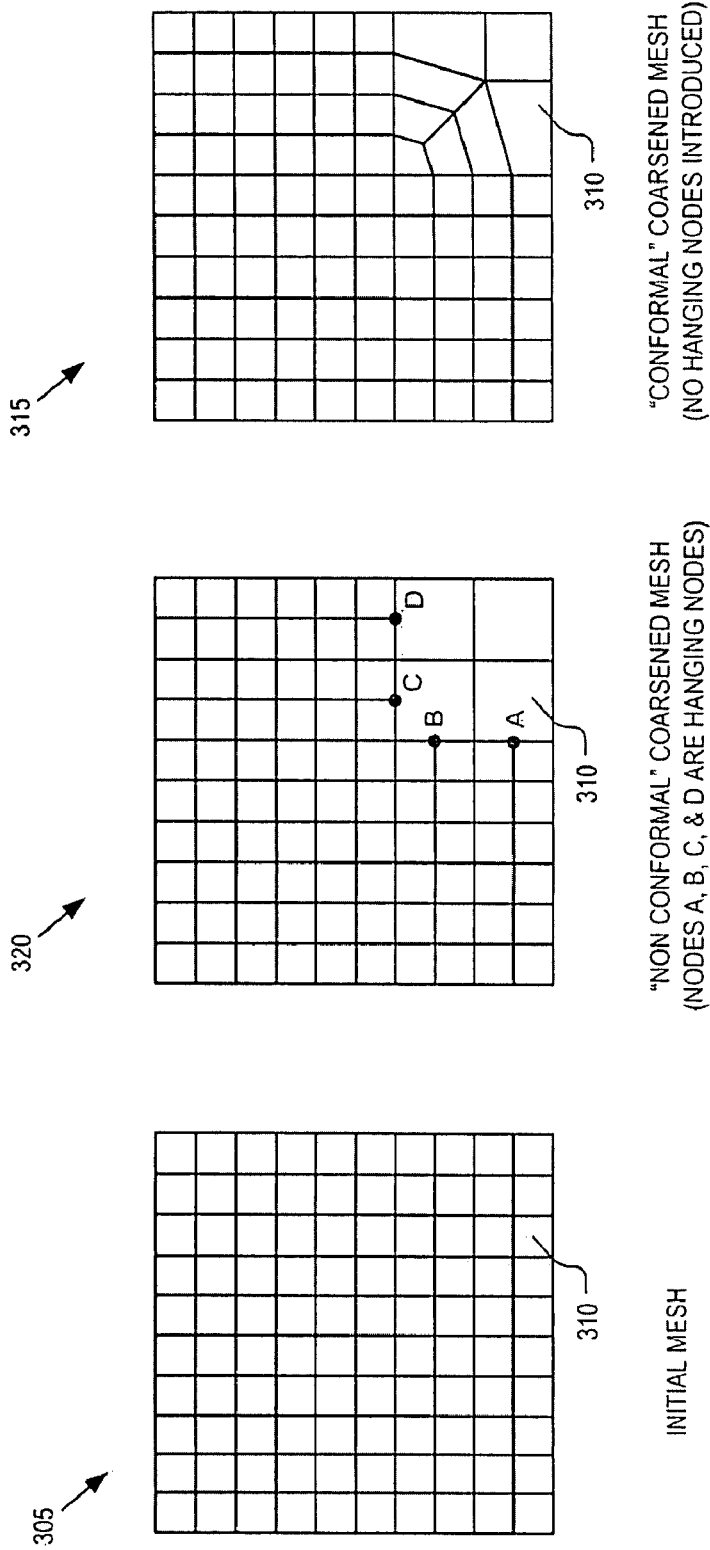
FIG. 3 illustrates conformal coarsening, in accordance with an embodiment of the invention.

Conformal Coarsening: A conformal mesh is a mesh which contains no "hanging nodes." A hanging node is a node that is spatially adjacent to a mesh element, but is not used as one of the corners or vertices of that mesh element. FIG. 3 illustrates an initial mesh 305 with a localized region 310 shaded. Localized region 310 indicates where mesh coarsening is to be performed. Both conformal coarsening (coarsened mesh 315) and non-conformal coarsening (coarsened mesh 320) of initial mesh 305 are illustrated. Non-conformal coarsening introduces hanging nodes. Conformal coarsening does not. Only a few FEM solvers support hanging nodes and non-conformal meshes. As a result, a coarsening procedure that introduces hanging nodes is only usable by some solvers. In addition, even if the FEM solver does support hanging nodes, the solution in these regions is often compromised because of the discontinuity in the mesh connectivity. As a result, a conformal coarsening procedure is often preferred.

Figure 4:
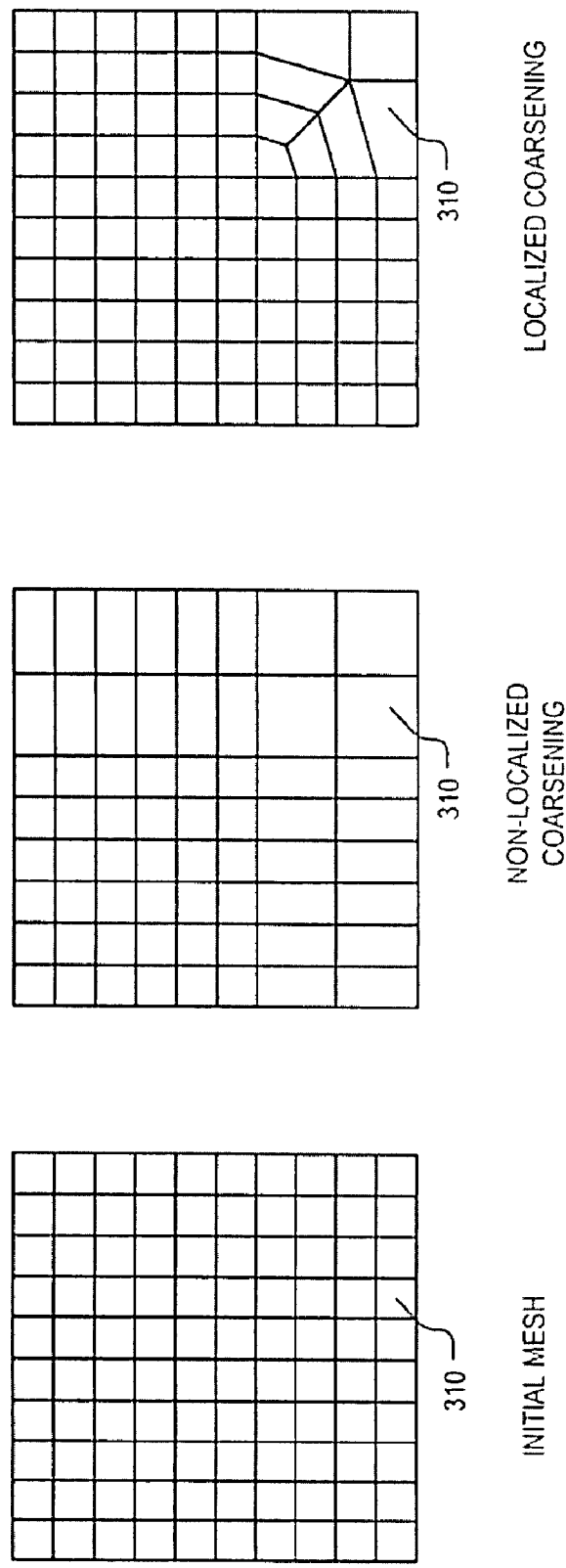
FIG. 4 illustrates localized and non-localized coarsening, in accordance with an embodiment of the invention.

Localized Coarsening: Non-localized mesh coarsening is where mesh elements are removed from parts of the mesh where coarsening is not desired as a side-affect of removing elements from a coarsening region. FIG. 4 illustrates both local and non-local coarsening. By not keeping the coarsening local, mesh elements are removed from parts of the mesh where coarsening was not requested. These other parts of the mesh may be critical to the FEA and the removal of elements from these other regions may compromise the quality of the solution. As a result, a coarsening procedure which only removes elements from a localized region where it is specified is usually preferred.

Figure 5:
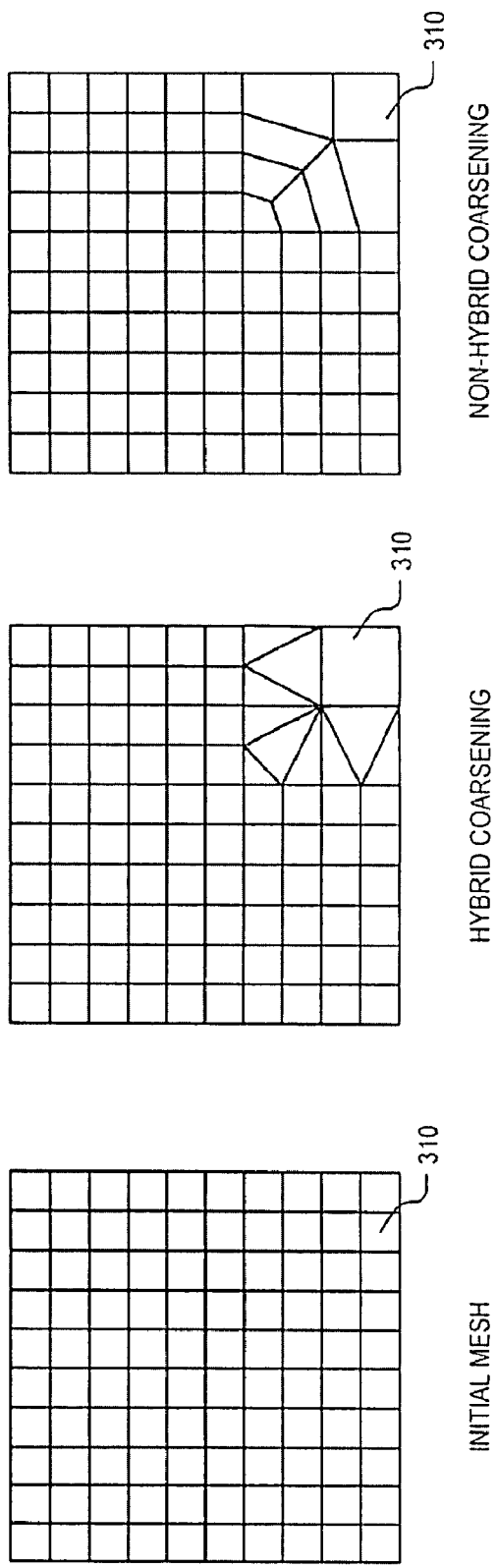
FIG. 5 illustrates hybrid and non-hybrid coarsening, in accordance with an embodiment of the invention.

Hybrid Coarsening: Hybrid mesh coarsening is where mesh elements are removed, but new element types are introduced in order to maintain a conformal mesh. FIG. 5 illustrates both hybrid and non-hybrid (e.g., all-quadrilateral) mesh coarsening. In hybrid coarsening of a quadrilateral mesh, triangular elements may be introduced. In 3D, hybrid coarsening introduces other element types such as pyramids, wedges, and tetrahedra. For many applications, all-quadrilateral/hexahedral elements are often superior in solution quality, if not required. As a result, the introduction of other mesh element types may compromise the quality of the FEA answers. Thus, a coarsening procedure which maintains the original mesh element types is often preferred.

Figure 6:
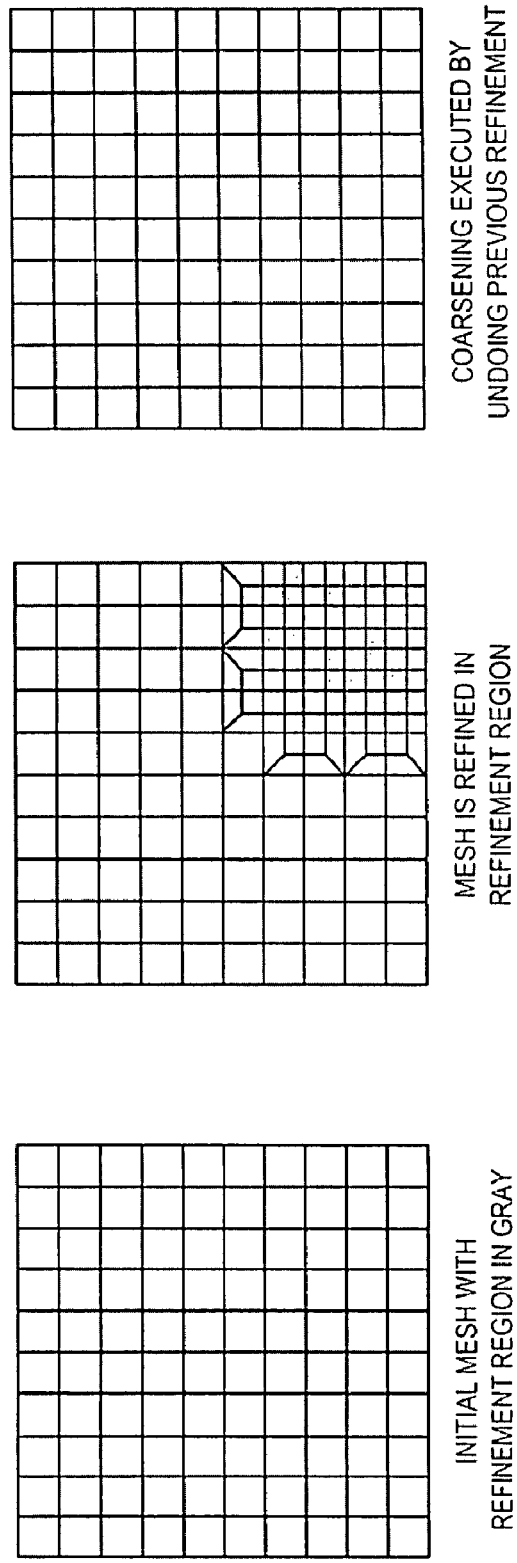
FIG. 6 illustrates a mesh coarsening which is dependent upon a previous refinement, in accordance with an embodiment of the invention.

Coarsening Independent of Prior Refinements: Often, coarsening is requested in a localized region of a mesh that was previous refined. In this case, coarsening can be done by remembering how the prior refinement was done, and simply undoing it. This is illustrated in FIG. 6. Although this is a valid method of coarsening, coarsening is often desired in regions that have no prior refinements to undo, or only a portion of a prior refinement is to be removed. In addition, if this method is implemented in a parallel processing system, information regarding prior refinements may reside on another processor, requiring potentially expensive processor communication. Thus, a method which does not rely on any prior refinements and can do coarsening on any mesh regardless of its origin is often preferred.

Figure 7:
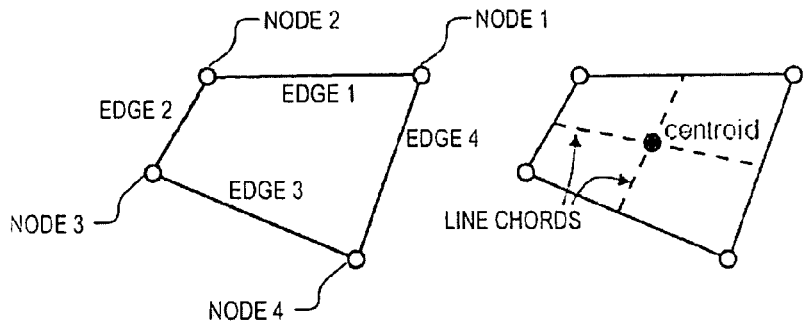
FIG. 7 illustrates a quadrilateral mesh element, in accordance with an embodiment of the invention.

Quadrilateral Mesh Element: FIG. 7 illustrates a single quadrilateral mesh element. As shown, it is defined by four nodes at each of its four corners, and four edges, which represent the sides of the mesh element. In a conformal quadrilateral mesh, each "internal" edge in the mesh is shared by exactly 2 quadrilateral elements. As such, given a quadrilateral element and one of its edges, it is easy to find the other quadrilateral attached to that edge. In addition, given a quadrilateral element, and one of its edges, it is easy to find the "opposite" edge or the oilier edge of the quadrilateral that does not share any nodes with the given edge. For example, in FIG. 7 edge 1 is opposite edge 3 and visa versa. Likewise, edge 2 is opposite edge 4.

Chord: A chord is a collection of mesh elements connected through opposite edges and which starts and stops on a terminal boundary of the mesh or loops back on itself.

Line Chord: A line chord is a type of chord. A line chord is a collection of lines connecting the midpoints of opposite edges of mesh elements and which starts and stops on a terminal boundary of the mesh or loops back on itself. FIG. 7 illustrates two line chords.

Figure 8:
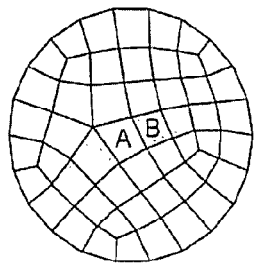

Quadrilateral Chord: A quadrilateral chord is a type of chord. A quadrilateral chord is a collection of quadrilateral elements which form a chain connected through opposite edges that starts and stops on a boundary or loops back on itself. Quadrilateral chords are also referred to as "quadrilateral columns." A quadrilateral chord is defined by selecting a starting edge in a quadrilateral mesh along with its 2 adjacent quadrilateral elements (elements A and B for example in FIG. 8). The opposite edges to the starting edge are then found in each adjacent element, along with their adjacent quadrilaterals. This propagation continues until edges on the terminal boundary of the mesh are found, or until the chord wraps back onto itself.

Figure 9:
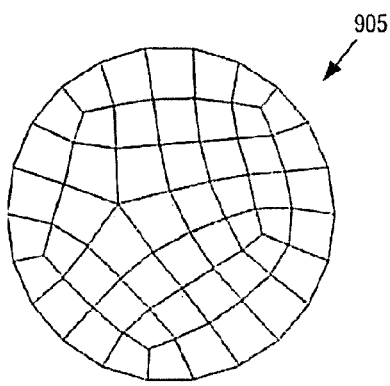
FIG. 9 illustrates a quadrilateral mesh and its mesh dual, in accordance with an embodiment of the invention.
Figure 9:
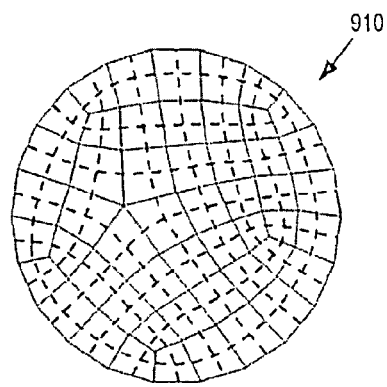

Mesh Dual: FIG. 9 illustrates a simple conformal quadrilateral mesh 905 and its mesh dual 910. In conformal quadrilateral meshes, the line chords (illustrated as dashed lines) in individual mesh elements combine into continuous line chord which wind and twist through the mesh. The number of chords in a mesh is defined by equation 1, where $P_{boundary}$ is the number of chords which start and stop on a boundary edge and $P_{circular}$ is the number of chords which close upon themselves.

$$P_{total} = P_{boundary} + P_{circular} \quad \text{(Equation 1)}$$

Each chord dual forms a new mesh column or "quadrilateral column." The total number of mesh elements in a quadrilateral mesh can then be defined by equation 2, where $N_i$ is the number of mesh elements in the mesh column defined by chord i.

$$N_{total} = \frac{1}{2} \sum_{i=1}^{P_{total}} N_i \quad \text{(Equation 2)}$$

Figure 10:
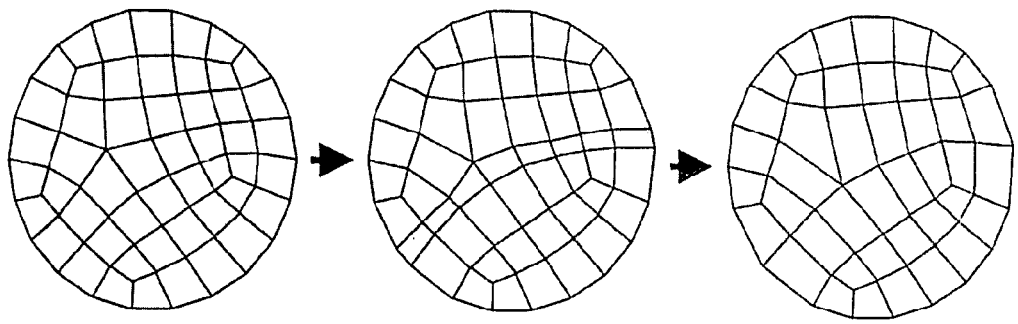
FIG. 10 illustrates a chord extraction operation in a quadrilateral mesh, in accordance with an embodiment of the invention.

Chord Extraction: Chord extraction is the conformal extraction of the mesh elements in a chord. Each of the edges, which define a chord are identified. Each edge is defined by two nodes for a quadrilateral mesh. These two nodes are spatially moved until they occupy the exact same spatial location. The connectivity of mesh elements is then adjusted to remove one of these nodes from the mesh. Quadrilateral chord extraction (also referred to as "quadrilateral column collapse") in a quadrilateral mesh is illustrated in FIG. 10. Chord extraction may provide non-localized coarsening since the mesh elements removed include all mesh elements in the quadrilateral chord, regardless of whether they are in the desired coarsening region or not.

Figure 11:
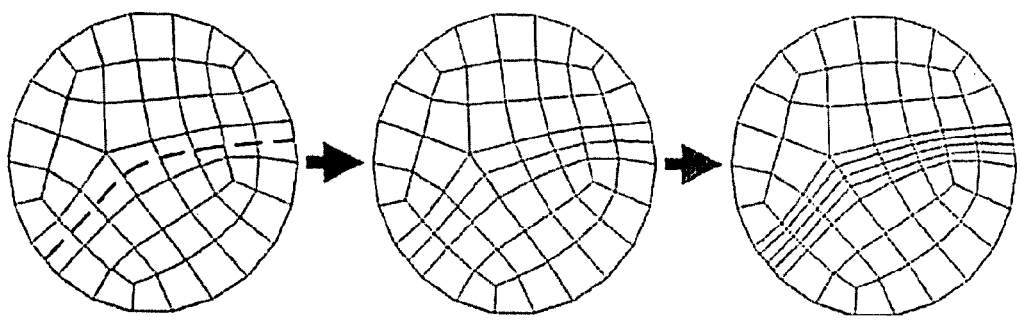
FIG. 11 illustrates a chord dicing operation in a quadrilateral mesh, in accordance with an embodiment of the invention.

Chord Dicing: A chord in a quadrilateral mesh can also be diced, or subdivided any number of times. In a quadrilateral mesh, there are a series of edges which are perpendicular to a chord running through the mesh. By splitting each of these edges, and connecting the split points of adjacent edges, the chord is diced. FIG. 11 illustrates two iterations of a dicing operation performed on a quadrilateral mesh dual chord. The dicing of a dual chord increases the number of elements in the mesh by $N_i$. However, like chord extraction, the affect is along the entire length of the chord.

Figure 12:
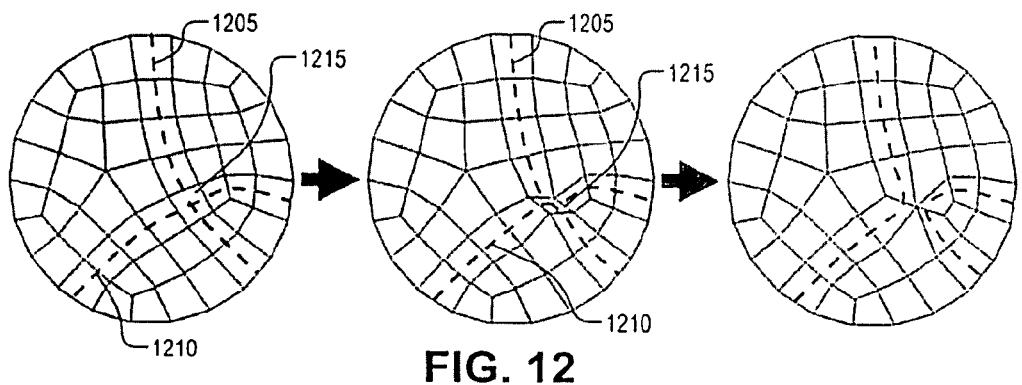
FIG. 12 illustrates an element collapse operation in a quadrilateral mesh, in accordance with an embodiment of the invention.

Mesh Element Collapse: FIG. 12 illustrates that each quadrilateral element in a quadrilateral mesh resides at the intersection of two dual chords 1205 and 1210. The mesh element 1215 residing at the intersection of these dual chords can be removed by performing an element collapse operation. A mesh element is collapsed in a quadrilateral mesh by merging two opposite nodes of the quadrilateral element, as shown in FIG. 12. The element collapse operation reduces the number of elements in the mesh by one and the reconfigured mesh dual chords no longer intersect.

Figure 13A:
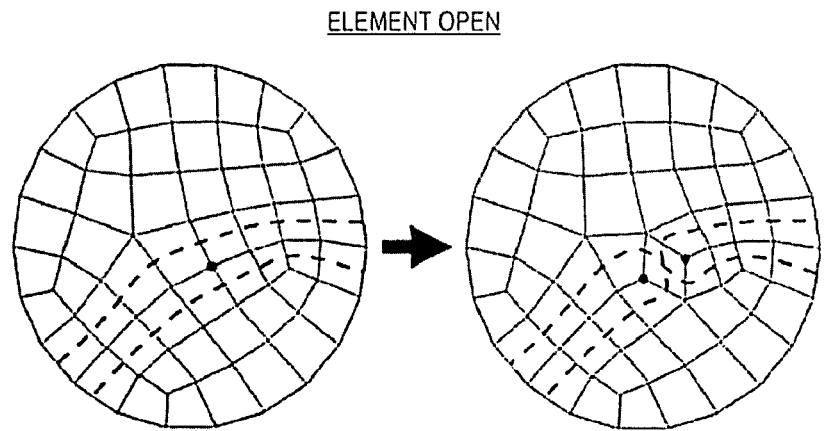
FIG. 13A illustrates an element open operation in a quadrilateral mesh, in accordance with an embodiment of the invention.
Figure 13B:
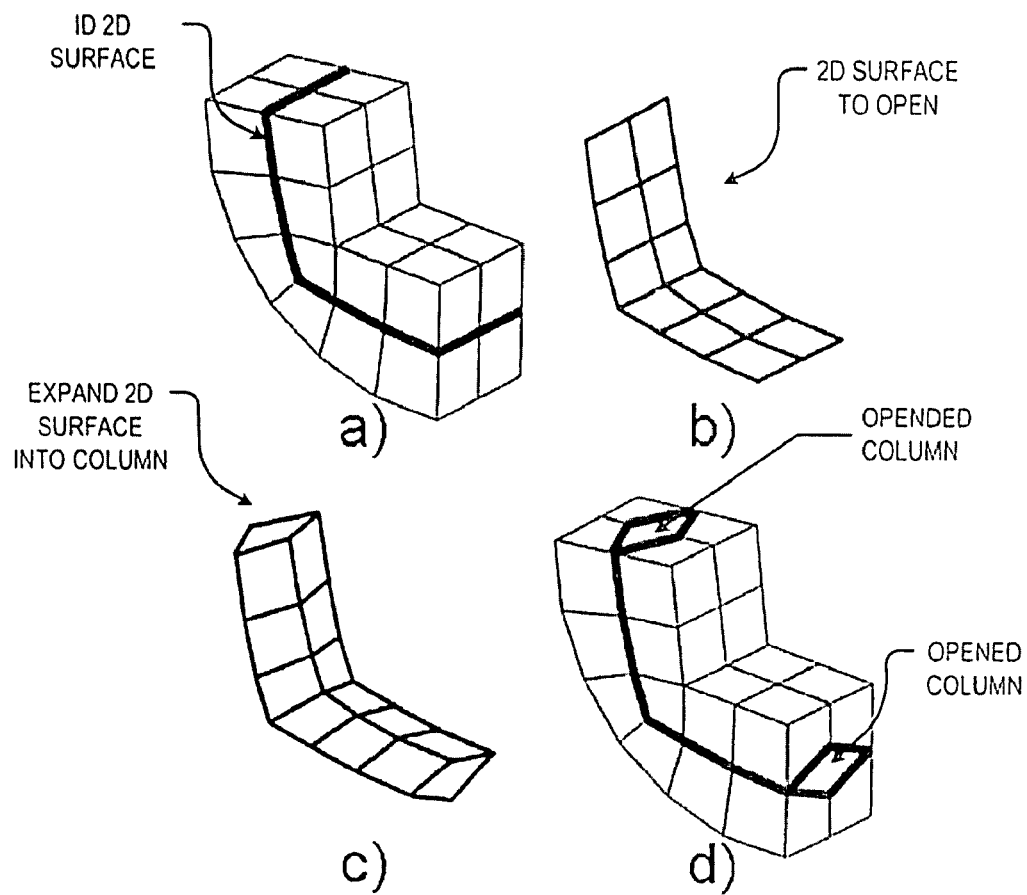
FIG. 13B illustrates a column open operation in a hexahedral mesh, in accordance with an embodiment of the invention.

Mesh Element Open: The element open operation has the inverse affect of the element collapse operation. Two dual chords which previously did not cross can be redirected so that they do cross as illustrated in FIG. 13A. A 3D corollary operation is the "column open" operation for inserting a hexahedral column into a hexahedral mesh as illustrated in FIG. 13B. In the column open operation, a 2D surface of quadrilaterals (quadrilateral column) is identified. The 2D surface is then opened by expanding a series of nodes within the identified quadrilateral column into two separate sets of nodes to create the opened column. Hexahedral columns are defined in connection with FIG. 16 below.

Figure 14A:
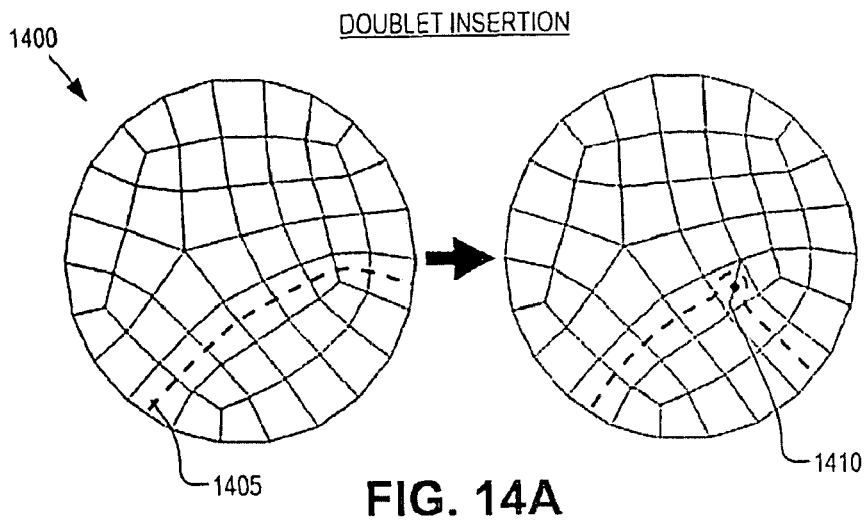
FIG. 14A illustrates a doublet insertion operation in a quadrilateral mesh, in accordance with an embodiment of the invention.
Figure 14B:
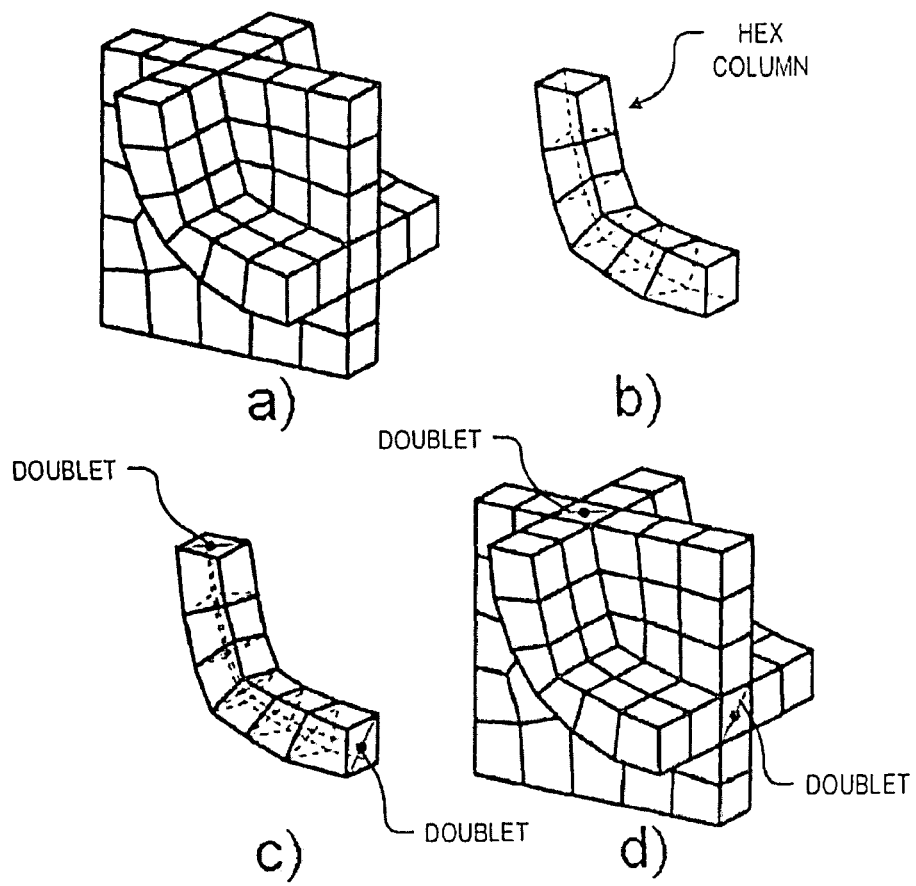
FIG. 14B illustrates a column doublet insertion operation in a hexahedral mesh, in accordance with an embodiment of the invention.

Doublet Insertion/Deletion: Another operation which modifies a mesh dual is the doublet insertion. A doublet is inserted by inserting two edges and a node on a line that connects two opposite nodes of a quadrilateral element. This line is referred to as a "doublet." FIG. 14A illustrates a line chord 1405 in a quadrilateral mesh 1400 and a doublet insertion performed on one of the quadrilateral elements associated with line chord 1405 to create doublet 1410. The two new quads share two edges which results in poor mesh quality. This operation creates an imperfect mesh because of the poorly shaped new elements that are formed. However, doublet insertion is often just an intermediate step and one of the resulting chords may ultimately be removed, leaving a valid mesh, as well as, enabling a coarsening operation. The value in the doublet insertion is its affect on the mesh dual. The doublet insertion operation increases the number of elements in the mesh by one. Doublet removal is the reverse operation, which removes two edges and a node. A 3D corollary to the doublet insertion is the "column doublet insertion" operation. In the column doublet insertion, the doublets are inserted within each mesh element along a hexahedral column through a hexahedral mesh, as illustrated in FIG. 14B. Hexahedral columns are defined in connection with FIG. 16 below.

Figure 15A:
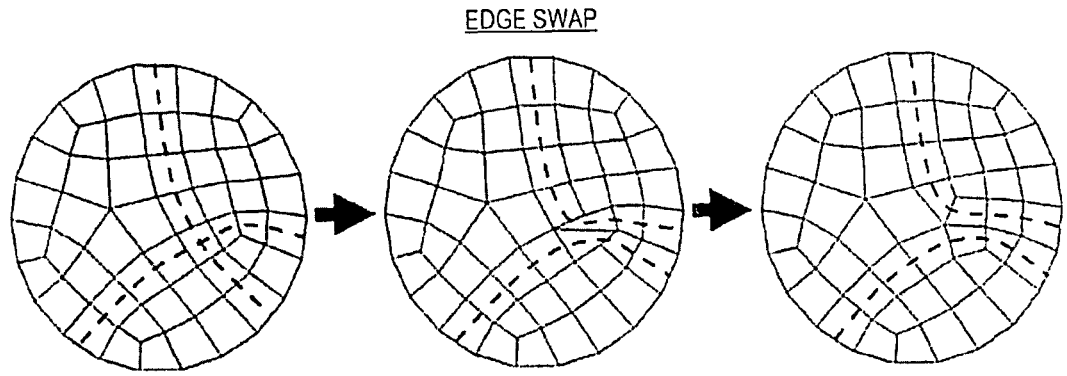
FIG. 15A illustrates an edge swap operation in a quadrilateral mesh, in accordance with an embodiment of the invention.
Figure 15B:
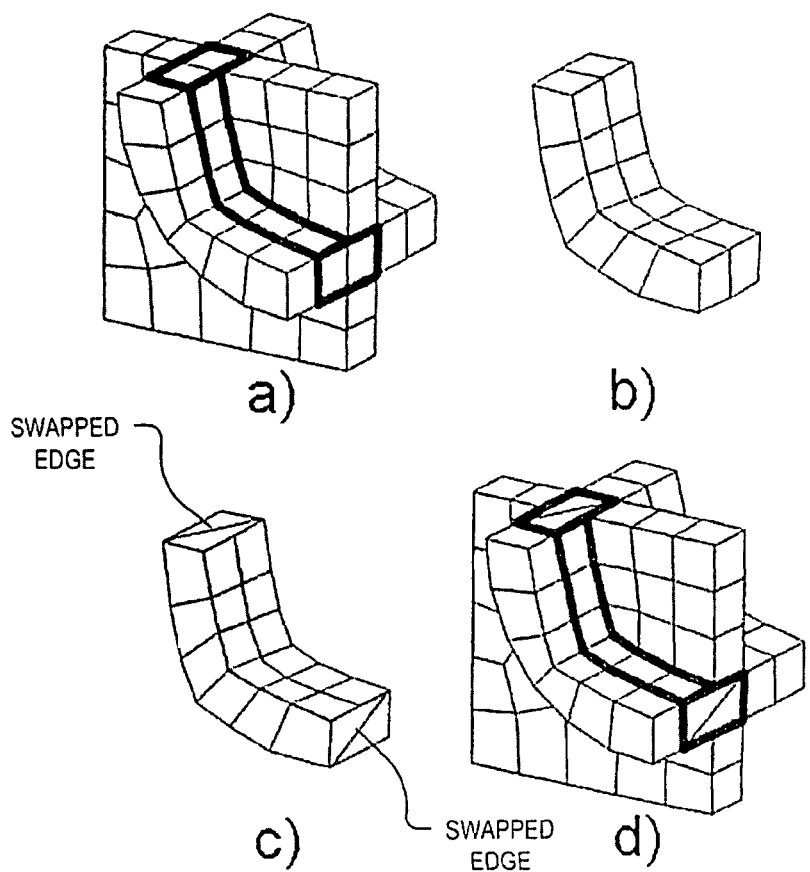
FIG. 15B illustrates a face swap operation in a hexahedral mesh, in accordance with an embodiment of the invention.

Edge Swap: An element edge swap in a quadrilateral mesh is performed by reconfiguring the nodes of two adjacent quadrilateral elements such that the edge between them is defined by two different nodes. FIG. 15A illustrates the element edge swap. Note that the element edge swap operation removes the intersection between two dual chords. The edge swap operation does not change the number of mesh elements in a mesh. A 3D corollary to the edge swap is the "face swap" operation. In the face swap operation, a series of edges along a hexahedral column through a hexahedral mesh is swapped, as illustrated in FIG. 15B. Hexahedral columns are defined in connection with FIG. 16 below.

Figure 16:
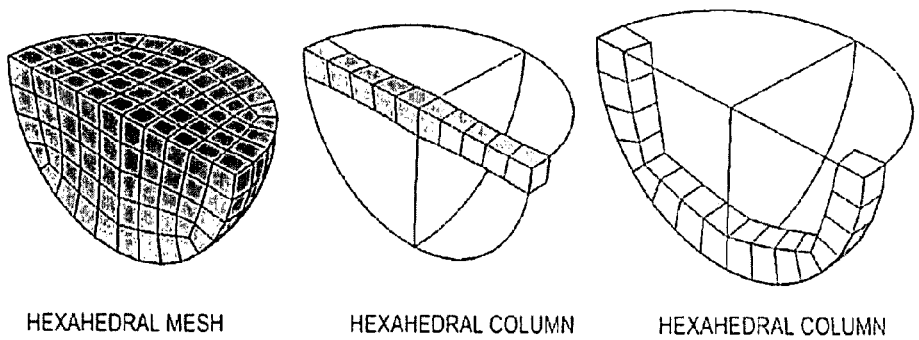
FIG. 16 illustrates hexahedral columns in a hexahedral mesh, in accordance with an embodiment of the invention.

Hexahedral Column: A hexahedral column is the 3D corollary to the 2D quadrilateral column or quadrilateral chord. A column of hexahedra is a collection of hexahedral mesh elements that form a chain of opposite faces on adjacent hexahedral elements and, which starts and stops on a terminal boundary of the mesh or loops back on itself. FIG. 16 illustrates an example hexahedral mesh and two of its hexahedral columns.

Figure 17:
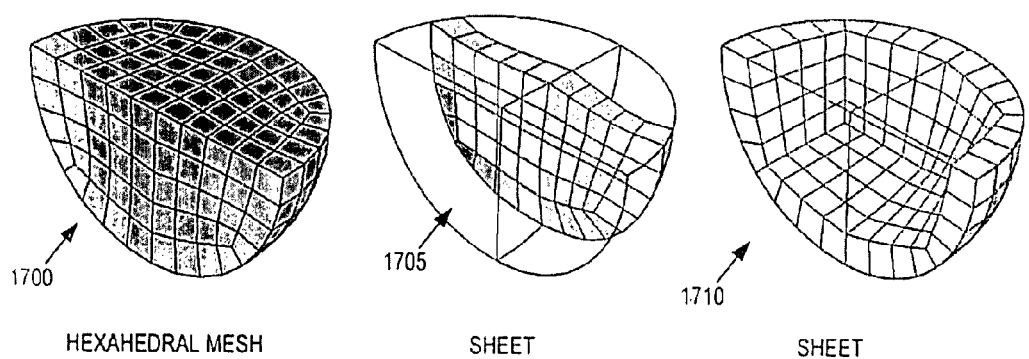
FIG. 17 illustrates a sheet in a hexahedral mesh, in accordance with an embodiment of the invention.
Figure 18:
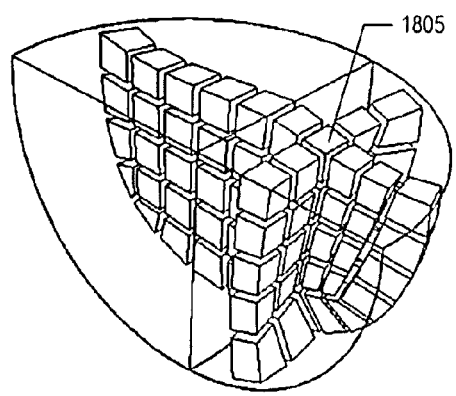
FIG. 18 illustrates how the intersection of two sheets in a hexahedral mesh defines a hexahedral column, in accordance with an embodiment of the invention.

Sheet: Similar to a column, a sheet in a hexahedral mesh is a collection of hexahedral elements which share opposite faces of the hexahedral elements in two separate directions creating a two dimensional surface, and which starts and stops on a terminal boundary of the mesh or loops back on itself. Two example sheets 1705 and 1710 within a hexahedral mesh 1700 are illustrated in FIG. 17. The intersection of two sheets forms a hexahedral column 1805 as illustrated in FIG. 18. A sheet is a 3D subset of a chord.

Figure 19:
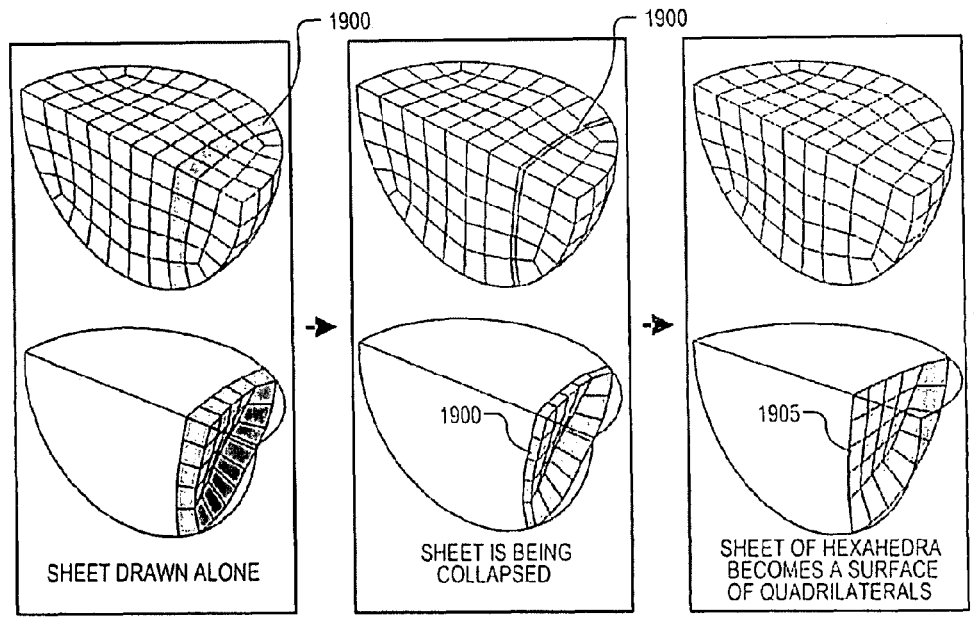
FIG. 19 illustrates a sheet extraction operation in a hexahedral mesh, in accordance with an embodiment of the invention.

Sheet Extraction: Similar to chord extraction, a sheet can be conformaly extracted from a hexahedral mesh by collapsing the edges that define the sheet. In FIG. 19, sheet 1900 is extracted from the hexahedral mesh by collapsing it into a surface 1905 of interconnected quadrilaterals.

Figure 20:
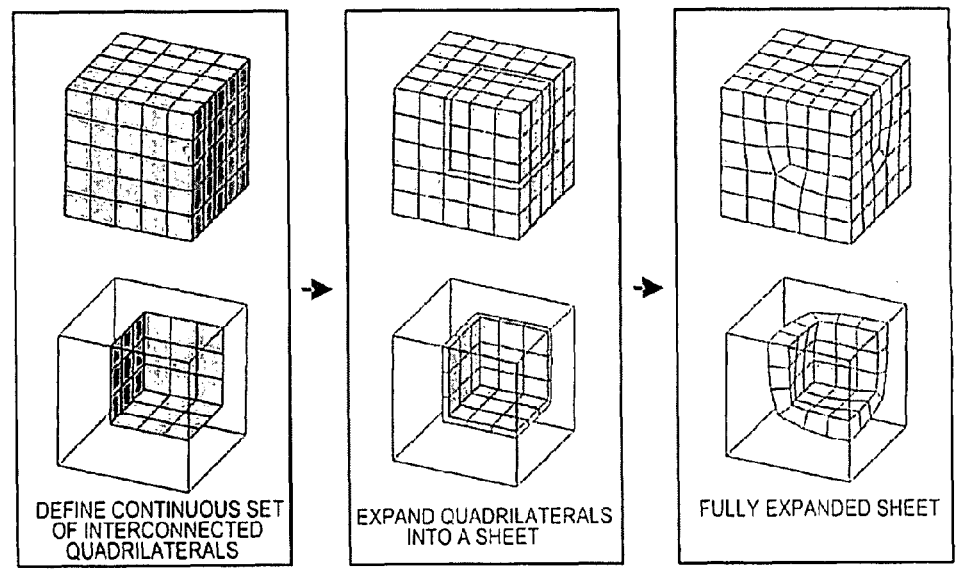
FIG. 20 illustrates a sheet insertion or "pillowing" operation in a hexahedral mesh, in accordance with an embodiment of the invention.

Sheet Insertion (a.k.a. "Pillowing"): FIG. 20 illustrates the sheet insertion operation. As can be seen, sheet insertion is the opposite of sheet extraction. In sheet extraction, a sheet of hexahedra is collapsed into a continuous set of interconnected quadrilateral faces. In contrast, sheet insertion starts from a continuous set of interconnected quadrilateral faces and expands it into a sheet of hexahedral elements.

Figure 21:
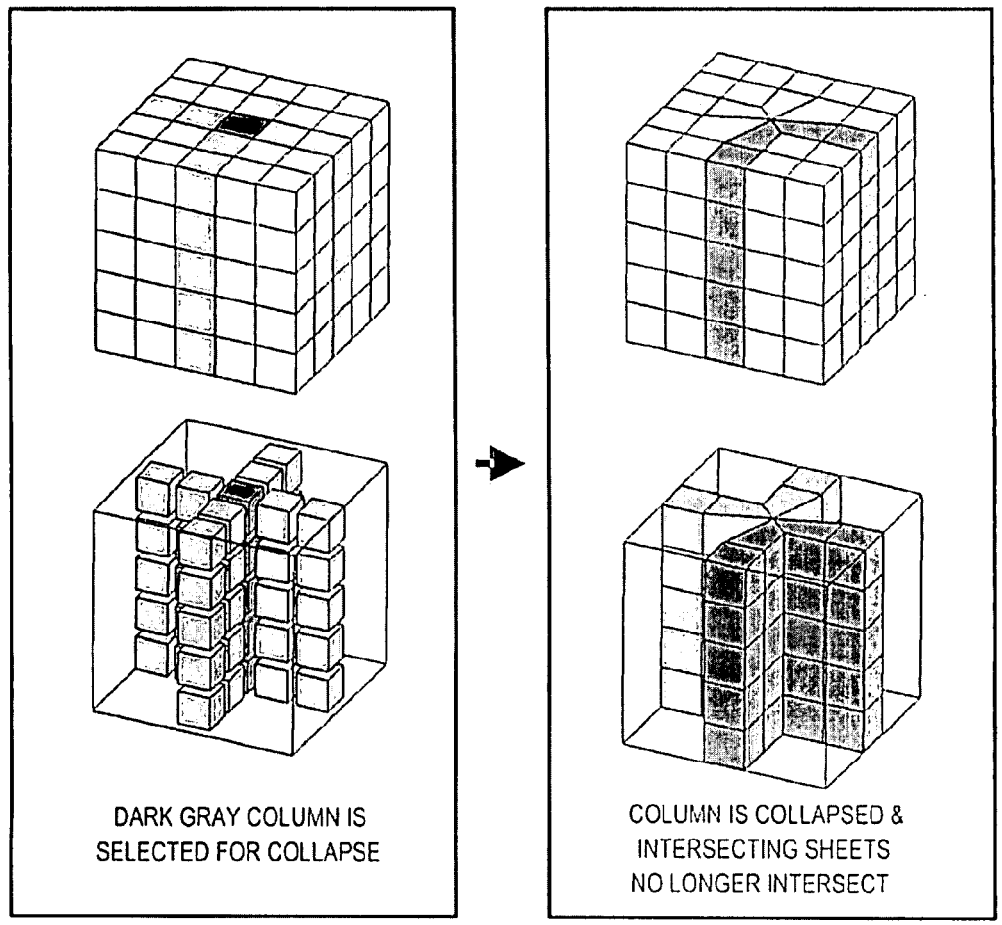
FIG. 21 illustrates a hexahedral column collapse operation in a hexahedral mesh, in accordance with an embodiment of the invention.

Hexahedral Column Collapse: The column collapse operation is illustrated in FIG. 21. A hexahedral column is the intersection of two hexahedral sheets. By collapsing the column, the intersection of the two sheets is removed, and the paths of the sheets are modified. Hexahedral column collapse is the 3D corollary in a hexahedral mesh to the 2D mesh element collapse, as illustrated in FIG. 12.

Mesh Coarsening

The definition section above defines a number of simplex chord operations, including chord extraction and presents operations that can be used to modify the mesh dual in order to control the path of chord duals. These concepts can be combined to produce a localized conformal mesh coarsening technique.

Figure 22:
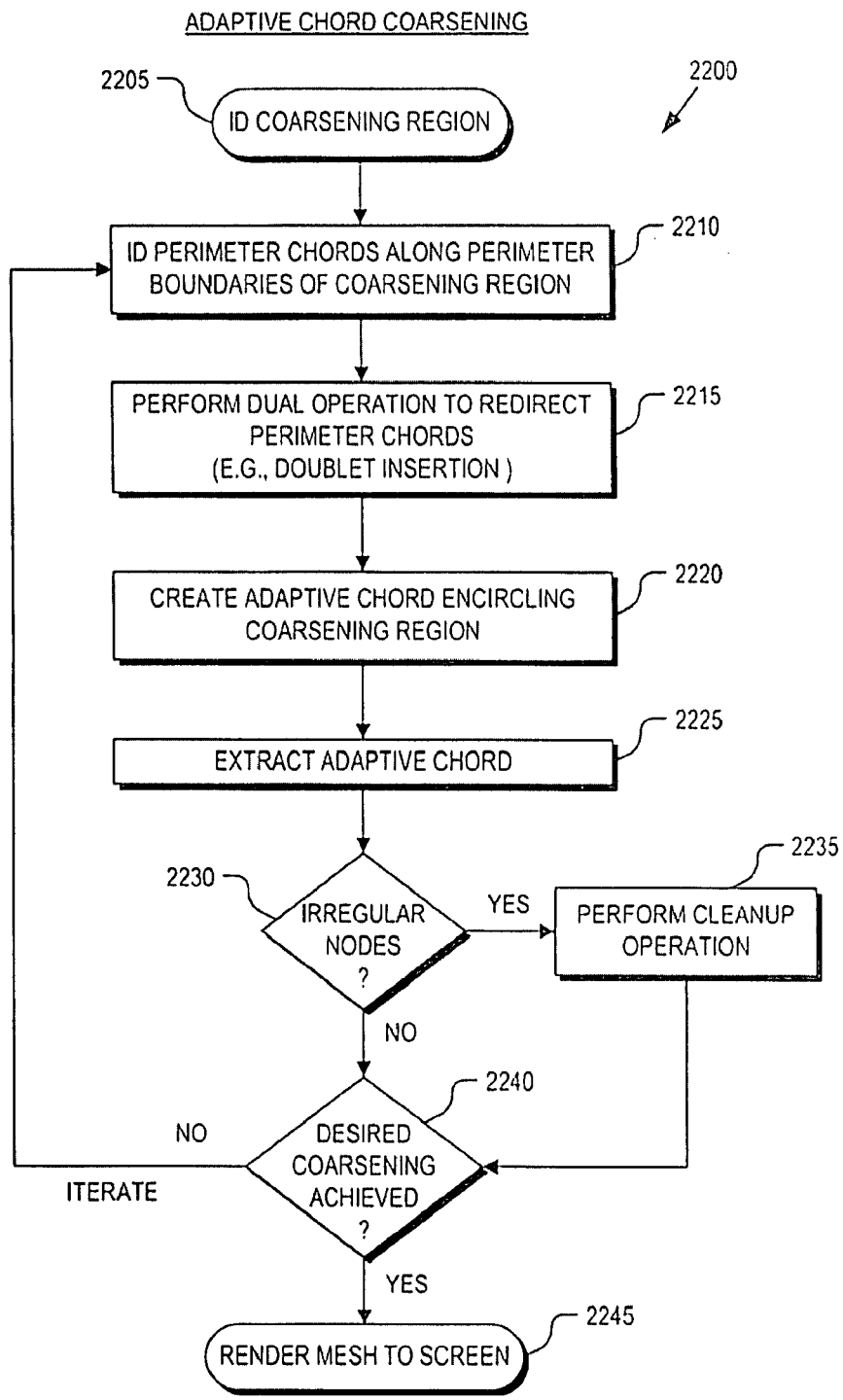
FIG. 22 is a flow chart illustrating a process for an adaptive chord coarsening technique, in accordance with an embodiment of the invention.

FIG. 22 is a flow chart illustrating a process 2200 for coarsening a quadrilateral or hexahedral mesh using an adaptive chord technique, in accordance with an embodiment of the invention. Process 2200 is described in connection with FIG. 23. The order in which some or all of the process blocks appear in process 2200 should not be deemed limiting. Rather, one of ordinary skill in the art having the benefit of the present disclosure will understand that some of the process blocks may be executed in a variety of orders not illustrated.

Figure 23:
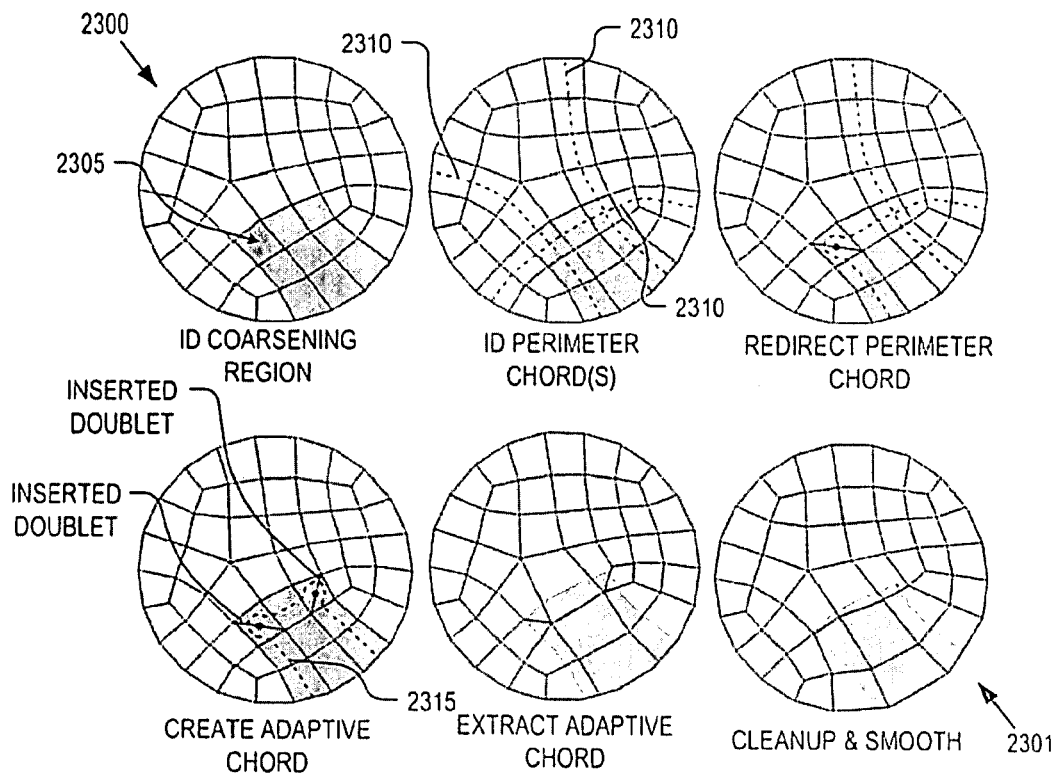
FIG. 23 illustrates the adaptive chord coarsening technique, in accordance with an embodiment of the invention.

In a process block 2205, a localized coarsening region 2305 is identified within mesh 2300 and the individual mesh elements within coarsening region 2305 determined. In a process block 2210, perimeter chords 2310 that run along a perimeter of coarsening region 2305 are identified. In the example of FIG. 23, three perimeter chords (chord duals) 2310 are identified. All three of the identified perimeter chords 2310 extend outside of coarsening region 2305. As a result, simple extraction of perimeter chords 2310 would result in the coarsening affect propagating outside of coarsening region 2305 (process block 2220). In a process block 2215, a dual operation is performed, which redirects perimeter chords 2310 to create an adaptive chord 2315 encircling coarsening region 2305. In the illustrated embodiment of FIG. 23, the particular dual operation performed is a doublet insertion on each mesh element coincident with an intersection between perimeter chords 2215.

Next, in a process block 2225, adaptive chord 2315 is extracted from mesh 2300. It should be appreciated that although FIG. 23 illustrates adaptive chord 2315 being created via a doublet insertion, other dual operations such as an element collapse, an element open, or an edge swap may also be performed to create adaptive chord 2315. In an alternative embodiment, multiple concentric adaptive chords can be generated within coarsening region 2305 at the same time, and then extracted together. This alternative embodiment can achieve a greater degree of coarsening with less iteration of process 2200.

A change in the number of mesh elements is defined by Equation 3 where $N_{extracted}$ is the number of elements in the adaptive chord, C is the number of element collapse operations performed, O is the number of element open operations performed, and D is the number of doublets inserted. In this example, the original mesh 2300 has 51 elements, while the coarsened mesh 2301 has 44 elements.

$$\Delta N_{total} = D + O - C - N_{extracted} \qquad \text{(Equation 3)}$$

The localization of the coarsening is maintained by careful construction of the adaptive chord such that it stays within the coarsening region. In the example of FIG. 23, the element density remains constant except for in and immediately around the specified coarsening region. In addition, the doublets which were inserted were removed during the extraction of adaptive chord 2315.

In a decision block 2230, if any irregular nodes (nodes having more or less than four adjacent mesh elements) were created during extraction of adaptive chord 2315, then cleanup operations are performed to remove the irregular nodes and mesh smoothing executed to more evenly distributed the mesh elements within the coarsened mesh 2301 (process block 2235). Mesh cleanup is a known technique that attempts to improve the quality of a mesh by modifying the connectivity of the mesh elements by performing simplex operations such as edge swaps, face opens, face closes, etc. If additional coarsening within coarsening region 2305 is desired (decision block 2240), then process 2200 can be iterated multiple times until the desired degree of coarsening is achieved. Finally, in a process block 2245, the final coarsened mesh is rendered to a display screen, or written to disk or memory (process block 2245). It should be appreciated that intermediate coarsened meshes may also be rendered to a display screen for each iteration, if so desired.

In practice, several different sets of perimeter chords and dual operations (e.g., doublet insertion, element collapse, element open, edge swap) operations could be examined to determine which set will result in the highest quality coarsened mesh. If, after all possible combinations of perimeter chords and dual operations are examined and no combination is found that will result in reasonable element quality, the coarsening algorithm could return a signal indicating that further coarsening is not possible. However, this situation is only likely to occur in areas where there are numerous geometric constraints, or where numerous iterations of coarsening have been previously applied.

Figure 24:
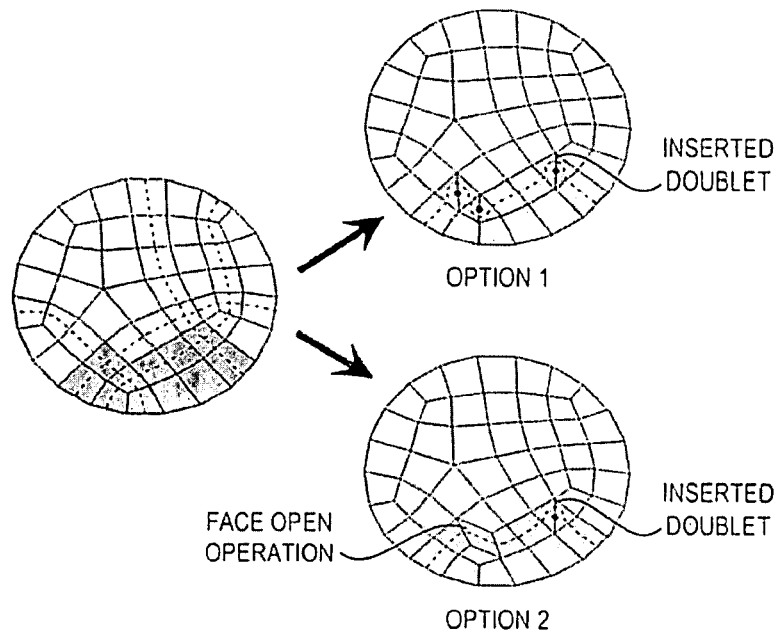
FIG. 24 illustrates example alternatives for creating an adaptive chord, in accordance with an embodiment of the invention.

When forming an adaptive chord, there are typically many combinations of operations which can be used, all with equally valid results. This decision could be based on a number of factors including valency of nearby nodes, proximity to a terminal boundary of the mesh, quality of the original mesh elements, and quality of the resulting mesh elements. FIG. 24 illustrates an alternative example with yet another set of elements specified for coarsening. Option 1 illustrates that three doublets could have been inserted to form an adaptive chord. Option 2 illustrates another equally valid adaptive chord formed by inserting one doublet and performing one element open operation. These examples illustrate that the types of operations performed during the creation of the adaptive chord depend upon the way that the identified perimeter chords intersect.

The concepts of dual chord modification, extraction, and dicing extend directly to three dimensions for hexahedral sheets. Like a dual chord in a quadrilateral mesh, a dual sheet can be extracted or diced in a hexahedral mesh. In addition, the quadrilateral dual operations of element collapse, element open, doublet insertion, and edge swap are extensible into three dimensions as the column collapse, column open, doublet column insertion, and face swap operations. Accordingly, process 2200 is equally applicable to coarsening in a hexahedral mesh as it is in a quadrilateral mesh by creation and extraction of "adaptive sheets" whose paths are limited to the specified coarsening region. These "adaptive sheets" are created by performing column collapse, column open, doublet column insertion, and/or face swap operations on the perimeter sheets. The adaptive sheet is the 3D corollary to the 2D adaptive chord. However, in some instances, coarsening a hexahedral mesh using adaptive sheets may not be localized.

The processes explained above are described in terms of computer software and hardware. The techniques described may constitute machine-executable instructions embodied within a machine (e.g., computer) readable medium, that when executed by a machine will cause the machine to perform the operations described. Additionally, the processes may be embodied within hardware, such as an application specific integrated circuit ("ASIC") or the like.

A machine-accessible medium includes any mechanism that provides (i.e., stores) information in a form accessible by a machine (e.g., a computer, network device, personal digital assistant, manufacturing tool, any device with a set of one or more processors, etc.). For example, a machine-accessible medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A computer implemented method of coarsening a finite element mesh ("FEM"), comprising:
    selecting, with a computer, a coarsening region within the FEM to be coarsened;
    selecting, with the computer, perimeter chords running along perimeter boundaries of the coarsening region;
    redirecting, with the computer, paths of the perimeter chords to create an adaptive chord separating the coarsening region from a remainder of the FEM, the adaptive chord running through mesh elements residing along the perimeter boundaries of the coarsening region;
    extracting, with the computer, the adaptive chord; and
    rendering, with the computer, the FEM to a display with fewer mesh elements in the coarsening region,
    wherein the FEM comprises a non-hybrid FEM, the coarsening region is localized to less than an entire portion of the FEM, and wherein the FEM comprises a conformal mesh with all mesh nodes forming a corner of a corresponding mesh element of the FEM.

2. The computer implemented method of claim 1, wherein redirecting the paths of the perimeter chords comprises inserting one or more doublet nodes within one or more mesh elements coincident with one or more intersections of the perimeter chords and residing along the perimeter boundaries of the coarsening region.

3. The computer implemented method of claim 1, wherein redirecting the paths of the perimeter chords to create the adaptive chord comprises at least one of an element collapse operation, an element open operation, or an edge swap operation.

4. The computer implemented method of claim 1, further comprising:
    generating multiple concentric adaptive chords within the coarsening region; and
    extracting the multiple concentric adaptive chords to further coarsen the coarsening region.

5. The computer implemented method of claim 1, wherein the FEM mesh comprises a quadrilateral mesh, the mesh elements comprise quadrilateral elements, and the adaptive chord comprises a line chord.

6. The computer implemented method of claim 1, wherein the FEM mesh comprises a hexahedral mesh, the mesh elements comprises hexahedral elements, the perimeter chords comprise perimeter sheets, and the adaptive chord comprises a hexahedral adaptive sheet.

7. The computer implemented method claim 1, further comprising performing an additional coarsening iteration on the coarsening region by repeating the selecting of the perimeter chords, the redirecting of the paths of the perimeter chords to create an adaptive chord, and the extracting of the adaptive chord.

8. A machine-accessible medium storing instructions that, when executed by a computer, will cause the computer to perform operations comprising:
    selecting, with the computer, a coarsening region within a finite element mesh ("FEM") to be coarsened;
    selecting, with the computer, perimeter chords running along perimeter boundaries of the coarsening region;
    redirecting, with the computer, paths of the perimeter chords to create an adaptive chord separating the coarsening region from a remainder of the FEM, the adaptive chord running through mesh elements residing along the perimeter boundaries of the coarsening region;
    extracting, with the computer, the adaptive chord; and
    rendering, with the computer, the FEM having fewer mesh elements in the coarsening region,
    wherein the FEM comprises a non-hybrid FEM and wherein the FEM comprises a conformal mesh with all mesh nodes forming a corner of a corresponding mesh element of the FEM.

9. The machine-accessible medium of claim 8, wherein redirecting the paths of the perimeter chords comprises inserting one or more doublet nodes within one or more mesh elements coincident with one or more intersections of the perimeter chords and residing along the perimeter boundaries of the coarsening region.

10. The machine-accessible medium of claim 8, wherein redirecting the paths of the perimeter chords comprises at least one of an element collapse operation, an element open operation, or an edge swap operation.

11. The machine-accessible medium of claim 8, wherein the adaptive chord comprises a single chord bounding the coarsening region.

12. The machine-accessible medium of claim 11, further storing instructions that, when executed by the computer, will cause the computer to perform further operations, comprising:
    generating multiple concentric adaptive chords within the coarsening region; and
    extracting the multiple concentric adaptive chords to further coarsen the coarsening region.

13. The machine-accessible medium of claim 11, further comprising reducing a number of irregular nodes having more or less than four adjacent mesh elements.

14. The machine-accessible medium of claim 8, wherein the FEM mesh comprises a quadrilateral mesh, the mesh elements comprise quadrilateral elements, and the adaptive chord comprises a line chord.

15. The machine-accessible of claim 14, wherein the coarsening region is localized to less than an entire portion of the FEM.

16. The machine-accessible medium of claim 8, wherein the FEM mesh comprises a hexahedral mesh, the mesh elements comprises hexahedral elements, the perimeter chords comprise perimeter sheets, and the adaptive chord comprises a hexahedral adaptive sheet.

17. The machine-accessible medium of claim 16, wherein the perimeter sheets are redirected to create the hexahedral adaptive sheet by performing at least one of a column collapse operation, a column open operation, a doublet column insertion operation, and face swap operation on the perimeter sheets.

18. The machine-accessible medium of claim 8, further comprising performing an additional coarsening iteration on the coarsening region by repeating the selecting of the perimeter chords, the redirecting the paths of the perimeter chords to create an adaptive chord, and the extracting of the adaptive chord.

19. The machine-accessible of claim 8, further comprising saving the FEM having fewer mesh elements in the coarsening region to a memory device.

20. A system, comprising:
a processor to execute instructions; and
a memory device coupled to the processor and having the instructions stored thereon, which when executed by the processor, will cause the processor to perform operations comprising:
  selecting a coarsening region within a finite element mesh ("FEM") to be coarsened;
  selecting perimeter chords running along perimeter boundaries of the coarsening region;
  redirecting the paths of the perimeter chords to create an adaptive chord separating the coarsening region from a remainder of the FEM, the adaptive chord running through mesh elements residing along the perimeter boundaries of the coarsening region; and
  extracting the adaptive chord,
wherein the FEM comprises a non-hybrid FEM and wherein the FEM comprises a conformal mesh with all mesh nodes forming a corner of a corresponding mesh element of the FEM.

21. The system of claim 20, wherein redirecting the paths of the perimeter chords comprises inserting one or more doublet nodes within one or more mesh elements coincident with one or more intersections of the perimeter chords and residing along the perimeter boundaries of the coarsening region.

22. The system of claim 20, wherein the instructions comprise further instructions, which when executed by the processor, will cause the processor to perform further operations comprising:
  performing an additional coarsening iteration on the coarsening region by repeating the selecting of the perimeter chords, the redirecting the paths of the perimeter chords to create an adaptive chord, and the extracting of the adaptive chord.

23. A machine-accessible medium storing instructions that, when executed by a computer, will cause the computer to perform operations comprising:
  selecting, with the computer, a coarsening region within a finite element mesh ("FEM") to be coarsened;
  selecting, with the computer, perimeter chords running along perimeter boundaries of the coarsening region;
  redirecting, with the computer, paths of the perimeter chords to create an adaptive chord separating the coarsening region from a remainder of the FEM, the adaptive chord running through mesh elements residing along the perimeter boundaries of the coarsening region;
  extracting, with the computer, the adaptive chord; and
  rendering, with the computer, the FEM having fewer mesh elements in the coarsening region,
wherein the FEM mesh comprises a hexahedral mesh, the mesh elements comprises hexahedral elements, the perimeter chords comprise perimeter sheets, and the adaptive chord comprises a hexahedral adaptive sheet.

24. A computer implemented method of coarsening a finite element mesh ("FEM"), comprising:
  selecting, with a computer, a coarsening region within the FEM to be coarsened;
  selecting, with the computer, perimeter chords running along perimeter boundaries of the coarsening region;
  redirecting, with the computer, paths of the perimeter chords to create an adaptive chord separating the coarsening region from a remainder of the FEM, the adaptive chord running through mesh elements residing along the perimeter boundaries of the coarsening region;
  extracting, with the computer, the adaptive chord;
  rendering, with the computer, the FEM to a display with fewer mesh elements in the coarsening region;
  generating multiple concentric adaptive chords within the coarsening region; and
  extracting the multiple concentric adaptive chords to further coarsen the coarsening region.

* * * * *